(12) United States Patent
Mori et al.

(10) Patent No.: US 12,163,047 B2
(45) Date of Patent: Dec. 10, 2024

(54) ELECTRON BEAM CURABLE COATING COMPOSITION

(71) Applicant: TOYOTA JIDOSHA KABUSHIKI KAISHA, Toyota (JP)

(72) Inventors: Kanji Mori, Nagakute (JP); Shuji Yomo, Nagakute (JP); Keiji Ambo, Miyoshi (JP); Mamoru Kouzaki, Miyoshi (JP); Atsuo Nabeshima, Okazaki (JP); Eiichi Okazaki, Takaoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/494,025

(22) Filed: Oct. 5, 2021

(65) Prior Publication Data

US 2022/0106498 A1    Apr. 7, 2022

(30) Foreign Application Priority Data

Oct. 6, 2020  (JP) .................... 2020-169057

(51) Int. Cl.
| | |
|---|---|
| *C09D 175/14* | (2006.01) |
| *C08F 290/06* | (2006.01) |
| *C08G 18/10* | (2006.01) |
| *C08G 18/62* | (2006.01) |
| *C08G 18/72* | (2006.01) |

(Continued)

(52) U.S. Cl.
CPC ........ *C09D 175/14* (2013.01); *C08F 290/067* (2013.01); *C08G 18/10* (2013.01); *C08G 18/6241* (2013.01); *C08G 18/728* (2013.01); *C09D 4/06* (2013.01); *C09D 175/16* (2013.01)

(58) Field of Classification Search
CPC ..... C08F 290/067; C09D 175/16; C09D 4/06; C08G 18/6241; C08G 18/6229
See application file for complete search history.

(56) References Cited

U.S. PATENT DOCUMENTS

| | | | |
|---|---|---|---|
| 7,064,165 B2 * | 6/2006 | Baumgart ............ | C09D 175/16 528/45 |
| 2003/0083397 A1 * | 5/2003 | Bradford ............ | C09D 201/025 522/173 |

(Continued)

FOREIGN PATENT DOCUMENTS

| | | |
|---|---|---|
| CN | 111032793 A | 4/2020 |
| JP | 2002361173 A | 12/2002 |
| JP | 2011084699 A | 4/2011 |

OTHER PUBLICATIONS

Chinese Office Action dated Aug. 26, 2022, which issued in the corresponding Chinese Patent Application No. 202111155619.6, including English translation.

*Primary Examiner* — Michael L Leonard
(74) *Attorney, Agent, or Firm* — Dickinson Wright, PLLC

(57) ABSTRACT

The present invention provides an electron beam curable coating composition comprising: an electron beam curable component (A) which contains 10% by mass or more of a multifunctional (meth)acrylate; and a room temperature curable component (B) which contains 1 to 15% by mass of an isocyanate group and is not cured by electron beam irradiation, wherein a solid content mass ratio of the component (B) to a total amount of the components (A) and (B) is 20 to 55% by mass.

2 Claims, 2 Drawing Sheets

(51) Int. Cl.
*C09D 4/06* (2006.01)
*C09D 175/16* (2006.01)

(56) References Cited

U.S. PATENT DOCUMENTS

| | | | |
|---|---|---|---|
| 2003/0171449 A1* | 9/2003 | Nienhaus | C09D 175/16 522/173 |
| 2004/0048977 A1* | 3/2004 | Wilke | C08G 18/807 524/589 |
| 2005/0154076 A1* | 7/2005 | Bach | C08G 18/792 522/8 |
| 2007/0088145 A1* | 4/2007 | Mgaya | C08G 18/6705 528/44 |
| 2020/0255686 A1* | 8/2020 | Mano | C08G 18/6692 |

* cited by examiner

ELECTRON BEAM CURABLE COATING COMPOSITION

BACKGROUND OF THE INVENTION

Field of the Invention

The present invention relates to an electron beam curable coating composition, and more specifically, to an electron beam curable coating composition containing a multifunctional (meth)acrylate as an electron beam curable component.

Related Background Art

Conventional methods for coating automobiles have been based on thermosetting. However, from the viewpoint of reducing energy consumption in recent years, there is a requirement for a coating method that does not need a baking process in order to reduce energy consumption in the automotive coating process, but non-thermal curing technology for automotive coating has not yet been put into practical use.

Known non-thermal curing technologies include ultraviolet (UV) curing technology, electron beam (EB) curing technology, and room temperature curing technology. However, UV curing technology is not suitable as a means of curing opaque coating films containing pigments and the like or thick coating films, because the coating film does not cure sufficiently when the permeability of ultraviolet light decreases. In addition, room temperature curing technology requires time for curing, resulting in low productivity.

On the other hand, EB curing technology has the advantages of energy saving, space saving, and shorter curing time, and has been employed for various applications such as printing, coating, and adhesion. In addition, since EB is more permeable than UV, EB curing technology is effective as a means of curing opaque coating films containing pigments and the like or thick coating films. For example, Japanese Unexamined Patent Application Publication No. 2002-361173 (Patent Document 1) describes a method for forming an electron beam cured multilayer coating film, including coating the surface of a substrate with an electron beam curable coating composition containing an electron beam curable (meth)acrylate resin, and then irradiating it with electron beams to cure the layers composed of the electron beam curable coating composition. However, there is a problem that the cured film formed using the electron beam curable coating composition containing the electron beam curable (meth)acrylate resin cannot achieve both high breaking elongation and high tensile strength (breaking stress). Patent Document 1 also states that polyisocyanate can be blended into the above-mentioned electron beam curable coating composition in order to improve the adhesion between the woody surface and the resin or to improve the curability of the resin.

SUMMARY OF THE INVENTION

However, the amount of polyisocyanate blended to improve adhesion and resin curability is about 5% by mass at most, and even if such an amount of polyisocyanate is blended into an electron beam curable coating composition containing an electron beam curable (meth)acrylate resin, it has been difficult to obtain a cured film with both high breaking elongation and high tensile strength (breaking stress).

The present invention has been made in view of the problems possessed by the related art described above, and an object of the present invention is to provide an electron beam curable coating composition which makes it possible to obtain a cured film with both high breaking elongation and high tensile strength (breaking stress).

The present inventors have made earnest studies to achieve the above object, and have found as a result that it is possible to obtain a cured film with both high breaking elongation and high tensile strength (breaking stress) by blending an electron beam curable component (A) which contains a multifunctional (meth)acrylate with a room temperature curable component (B) which contains an isocyanate group and is not cured by electron beam irradiation in a predetermined ratio. Thus, the present invention has been completed.

Specifically, an electron beam curable coating composition of the present invention comprises: an electron beam curable component (A) which contains 10% by mass or more of a multifunctional (meth)acrylate; and a room temperature curable component (B) which contains 1 to 15% by mass of an isocyanate group and is not cured by electron beam irradiation, wherein a solid content mass ratio of the component (B) to a total amount of the components (A) and (B) is 20 to 55% by mass.

In the electron beam curable coating composition of the present invention, it is preferable that the electron beam curable component (A) contains 10% by mass or more of a trifunctional or higher (meth)acrylate. In addition, it is preferable that the room temperature curable component (B) is a mixture of a compound having the isocyanate group and a compound having a functional group containing active hydrogen. Further, it is preferable that the compound having a functional group containing active hydrogen is at least one selected from the group consisting of compounds having a hydroxyl group and compounds having an amino group.

Although it is not necessarily clear why the electron beam curable coating composition of the present invention makes it possible to obtain a cured film with both high breaking elongation and high tensile strength (breaking stress), the present inventors infer as follows. Specifically, the electron beam curable coating composition of the present invention contains an electron beam curable component (A) which contains a multifunctional (meth)acrylate and a room temperature curable component (B) which contains an isocyanate group and is not cured by electron beam irradiation. When a coating film made of such an electron beam curable coating composition is cured at room temperature, the room temperature curable component (B) is cured to form a cross-linked structure (B), resulting in a semi-cured film. Then, when the semi-cured film is subjected to electron beam irradiation, the electron beam curable component (A) is cured to form a cross-linked structure (A), resulting in the desired cured film. The cured film formed in this way contains the cross-linked structure (A) and the cross-linked structure (B), and these cross-linked structures (A) and (B) are not bonded (cross-linked) to each other but form a structure intricate to each other (double network structure), thus achieving both high breaking elongation and high tensile strength.

In the present invention, the compatibility between high breaking elongation and high tensile strength (breaking stress) in the cured film (usefulness of the cured film) is evaluated in the following manner. Specifically, the higher the tensile strength (breaking stress), the better the performance of the cured film, so that the usefulness of the cured film is proportional to the tensile strength (breaking stress).

Here, when the S-value is defined as an indicator for the usefulness of the cured film, and the higher the usefulness of the cured film, the higher the S-value, the S-value and tensile strength (breaking stress) have a proportional relationship as shown in FIG. 1A.

As for the breaking elongation, since the necessary property of the cured film is that the cured film does not break when it follows the deformation of the coating substrate, the larger the breaking elongation, the larger the S-value becomes in the range where the breaking elongation is smaller than the elongation of the cured film due to the deformation of the coating substrate. On the other hand, in the range where the breaking elongation is larger than the elongation of the cured film due to the deformation of the coating substrate, the S-value remains constant because a larger breaking elongation does not contribute to the usefulness of the cured film. In automotive exterior parts, the maximum elongation of the cured film due to the deformation of the coating substrate is considered to be 10%, and for practical purposes, a breaking stress of 20 MPa or more is considered necessary, so that the breaking stress is defined to be 20 MPa (20 in S-value) when the breaking elongation is 20%, as shown in FIG. 1B.

These are expressed in the following formulas:

$$S = Y + 2 \times X \quad (X \leq 10)$$

$$S = Y + 20 \quad (X > 10)$$

(S is an index for the usefulness of the coating film, X is the breaking elongation [%], and Y is the breaking stress [MPa]).

The cured film with a higher S-value obtained in this way indicates a higher usefulness, and in the present invention, the S-value is calculated using the above formulas from the values of the breaking elongation X and breaking stress Y of the cured film, and this S-value is used to evaluate the usefulness of the cured film.

According to the present invention, it is possible to obtain a cured film with both high tensile strength (breaking stress) and high breaking elongation.

DETAILED DESCRIPTION OF THE PREFERRED EMBODIMENTS

Figure 1A:
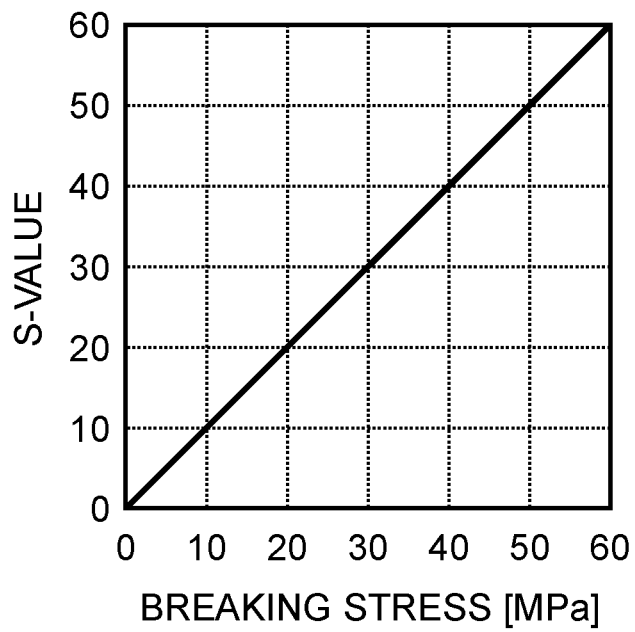
FIG. 1A is a graph showing the relationship between the S-value, an indicator for the usefulness of the cured film, and the breaking stress.
Figure 1B:
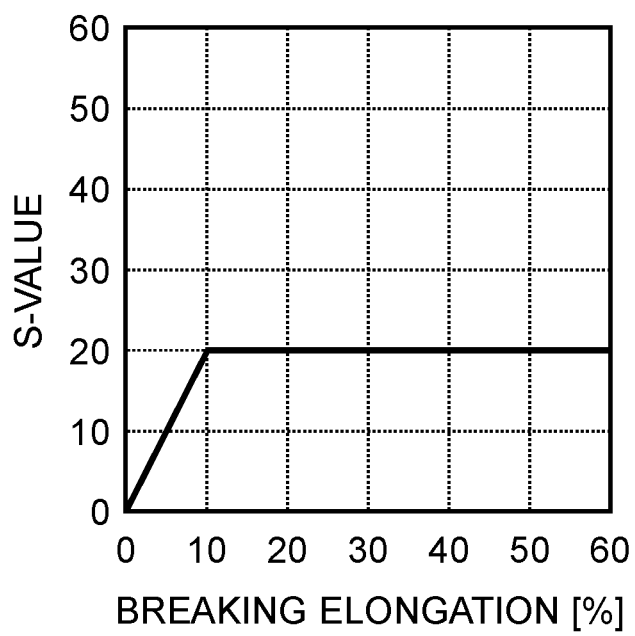
FIG. 1B is a graph showing the relationship between the S-value, an indicator for the usefulness of the cured film, and the breaking elongation.

Hereinafter, the present invention is described in detail according to the preferred embodiment thereof.
[Electron Beam Curable Coating Composition]

First, the electron beam curable coating composition of the present invention is described. An electron beam curable coating composition of the present invention comprises: an electron beam curable component (A) which contains 10% by mass or more of a multifunctional (meth)acrylate; and a room temperature curable component (B) which contains 1 to 15% by mass of an isocyanate group and is not cured by electron beam irradiation, wherein a solid content mass ratio of the component (B) to a total amount of the components (A) and (B) is in a range of 20 to 55% by mass.
(A) Electron Beam Curable Component The electron beam curable component (A) used in the present invention contains 10% by mass or more of a multifunctional (meth)acrylate, in which electron beam irradiation produces radicals, and radical polymerization allows the multifunctional (meth)acrylate to form a cross-linked structure and cure thereafter. By using an electron beam curable component (A) containing a multifunctional (meth) acrylate in a ratio within the above range, it is possible to obtain a cured film having high tensile strength (breaking stress). On the other hand, if the content of the multifunctional (meth)acrylate is less than the above lower limit, the cross-linked structure by the multifunctional (meth)acrylate is not sufficiently formed, which reduces the tensile strength (breaking stress) of the resulting cured film. From the viewpoint of improving the tensile strength (breaking stress) of the resulting cured film, the content of the multifunctional (meth)acrylate is preferably 20% by mass or more, more preferably 40% by mass or more, further preferably 60% by mass or more, and particularly preferably 80% by mass or more. The upper limit of the content of the multifunctional (meth)acrylate is 100% by mass, that is, when the above-mentioned electron beam curable component (A) is composed solely of multifunctional (meth)acrylate.

There are no particular restrictions on the multifunctional (meth)acrylate used in the present invention, as long as it has two or more (meth)acryloyl groups in one molecule (that is, a bifunctional or higher (meth)acrylate), and examples thereof include bifunctional (meth)acrylates such as 1,4-butanediol di(meth)acrylate, neopentyl glycol di(meth)acrylate, 1,6-hexanediol di(meth)acrylate, 1,9-nonanediol di(meth)acrylate, tricyclodecanedimethanol di(meth)acrylate, neopentyl glycol hydroxypivalate di(meth)acrylate, 3-methyl-1,5-pentanediol di(meth)acrylate, 2-butyl-2-ethyl-1,3-nonanediol di(meth)acrylate, 2-methyl-1,8-octanediol di(meth)acrylate, 2-hydroxy-1,3-di(meth)acryloyloxy propane, 2-hydroxy-3-(meth)acryloyloxy propyl (meth)acrylate, and glycerin di(meth)acrylate; trifunctional or higher (meth)acrylates such as trimethylolpropane tri(meth)acrylate, pentaerythritol tri(meth)acrylate, pentaerythritol tetra (meth)acrylate, dipentaerythritol penta(meth)acrylate, dipentaerythritol hexa(meth)acrylate, and ditrimethylolpropane tetra(meth)acrylate; multifunctional (meth)acrylates of an alkylene oxide [such as ethylene oxide and propylene oxide] adduct of a raw material alcohol for these multifunctional (meth)acrylates; multifunctional (meth)acrylates of a caprolactone modified product of a raw material alcohol for these multifunctional (meth)acrylates; multifunctional (meth)acrylates of alkylene oxide-modified isocyanuric acid such as di(meth)acrylate of ethylene oxide-modified isocyanuric acid and tri(meth)acrylate of ethylene oxide-modified isocyanuric acid; and (meth)acrylate oligomers such as urethane (meth)acrylate, polyester (meth)acrylate, epoxy (meth)acrylate, and polyether (meth)acrylate. In the present specification, (meth)acrylate is a generic term for acrylate and methacrylate, and means one or both of acrylate and methacrylate. The same is true for (meth)acryloyl groups and (meth)acrylic acid. These multifunctional (meth)acrylates may be used alone or in combination with two or more types. Among these multifunctional (meth)acrylates, trifunctional or higher (meth)acrylates are preferable from the viewpoint that the cross-linking density of the resulting cured film is increased and the tensile strength (breaking stress) is further improved.

In the present invention, as such multifunctional (meth) acrylates, appropriately synthesized ones may be used, or commercial products (such as the Aronix series, commercially available as photocurable resins manufactured by Toagosei Co., Ltd.) may be used.

In the above-mentioned electron beam curable component (A), from the viewpoint that the cross-linking density of the resulting cured film is increased and the tensile strength (breaking stress) is further improved, the content of the trifunctional or higher (meth)acrylate is preferably 10% by mass or more, more preferably 15% by mass or more, further preferably 20% by mass or more, particularly preferably 25% by mass or more, and most preferably 30% by mass or more. The upper limit of the content of the trifunctional or higher (meth)acrylate is 100% by mass, that is, when the above-mentioned electron beam curable component (A) is composed solely of trifunctional or higher (meth)acrylate.

In the above electron beam curable component (A), when the content of the multifunctional (meth)acrylate is less than 100% by mass, examples of the additional electron beam curable components used in combination with the multifunctional (meth)acrylate include monofunctional (meth)acrylates, vinyl esters, vinyl ethers, vinyl cyanide, styrene, vinyl halide, vinylidene halide, maleic acid diesters, fumaric acid diesters, itaconic acid diesters, dialkyl acrylamides, and heterocyclic vinyl compounds, as well as polyester modified products, urethane modified products, ethylene oxide modified products, caprolactone modified products, and other various modified products thereof. These additional electron beam curable components may be used alone or in combination with two or more types.

(B) Room Temperature Curable Component

The room temperature curable component (B) used in the present invention is not cured by electron beam irradiation, but forms a cross-linked structure at room temperature and cures thereafter. If the room temperature curable component (B) is cured by electron beam irradiation, the electron beam irradiation in curing the electron beam curable component (A) forms a cross-linked structure between the room temperature curable component (B) and the electron beam curable component (A), so that the double network structure of the cross-linked structure (A) by the electron beam curable component (A) and the cross-linked structure (B) by the room temperature curable component (B) is not formed, which reduces the breaking elongation of the resulting cured film.

The room temperature curable component (B) contains 1 to 15% by mass of an isocyanate group. By using a room temperature curable component (B) containing an isocyanate group in a ratio within the above range, it is possible to obtain a cured film having both high tensile strength (breaking stress) and high breaking elongation, that is, a cured film having a high S-value (S57). On the other hand, if the content of the isocyanate group is less than the above lower limit, the cross-linked structure (B) is not sufficiently formed, which reduces the tensile strength (breaking stress) of the resulting cured film. Meanwhile, if the above upper limit is exceeded, the cross-linked structure (B) is excessively formed, and in the double network structure between the cross-linked structure (A) and the cross-linked structure (B), the entanglement between the cross-linked structure (A) and the cross-linked structure (B) becomes too much, which reduces the breaking elongation of the resulting cured film. In addition, the lower limit of the content of the isocyanate group is preferably 3% by mass or more, more preferably 4% by mass or more, further preferably 5% by mass or more, and particularly preferably 6% by mass or more, from the viewpoint that the cross-linked structure (B) by the room temperature curable component (B) is formed appropriately, which improves the tensile strength (breaking stress) of the resulting cured film. Further, the upper limit of the content of the isocyanate group is preferably 14% by mass or less, more preferably 13% by mass or less, further preferably 12% by mass or less, and particularly preferably 11% by mass or less, from the viewpoint that entanglement between the cross-linked structure (A) and the cross-linked structure (B) is formed appropriately, which improves the breaking elongation of the resulting cured film.

Such a room temperature curable component (B) usually contains a compound having an isocyanate group so that the content of the isocyanate group is within the above range. Examples of such a compound having an isocyanate group include tolylene diisocyanate (TDI), diphenylmethane diisocyanate (MDI), hexamethylene diisocyanate (HDI), isophorone diisocyanate (IPDI), xylylene diisocyanate (XDI), hydrogenated xylylene diisocyanate (H6XDI), naphthalene diisocyanate (NDI), and methylenebis cyclohexylene diisocyanate (H12MDI), as well as biuret forms, adduct forms, and isocyanurate forms of these isocyanates. These compounds having an isocyanate group may be used alone or in combination with two or more types. Among these compounds having an isocyanate group, aliphatic isocyanates and alicyclic isocyanates are preferable, and isocyanurates of aliphatic isocyanates are particularly preferable, from the viewpoint of preventing yellowing and other defects in the cured film when durability in outdoor environments is important.

In addition, it is preferable that the room temperature curable component (B) is a mixture of a compound having the isocyanate group and a compound having a functional group containing active hydrogen. This improves the tensile strength (breaking stress) of the resulting cured film because the isocyanate group and the functional group containing active hydrogen react at room temperature to form the cross-linked structure (B). There are no particular restrictions on the compound having a functional group containing active hydrogen, as long as it is not cured by electron beam irradiation and reacts with an isocyanate group at room temperature to form the cross-linked structure (B), and examples thereof include compounds having hydroxyl groups and compounds having amino groups. These compounds may be used alone or in combination with two or more types.

There are no particular restrictions on the compounds having hydroxyl groups, as long as they are used as raw materials for room temperature curable isocyanate curing resin compositions, and examples thereof include hydroxyl group-containing resins such as hydroxyl group-containing acrylic resins and hydroxyl group-containing polyester resins. These compounds having hydroxyl groups may be used alone or in combination with two or more types.

There are no particular restrictions on the compounds having amino groups, and examples thereof include amino group-containing resins such as amino group-containing acrylic resins and amino group-containing polyester resins. These compounds having amino groups may be used alone or in combination with two or more types.

(Electron Beam Curable Coating Composition)

The electron beam curable coating composition of the present invention contains the electron beam curable component (A) and the room temperature curable component (B)

in an amount such that the solid content mass ratio of the room temperature curable component (B) to the total amount of these [(A)+(B)] is within the range of 20 to 55% by mass. By adjusting the solid content mass ratio of the room temperature curable component (B) within the above range, it is possible to obtain a cured film having both high tensile strength (breaking stress) and high breaking elongation, that is, a cured film having a high S-value (S≥7). On the other hand, if the solid content mass ratio of the room temperature curable component (B) is less than the above lower limit, in the resulting cured film, the breaking elongation increases but exceeds 10%, and the breaking stress greatly decreases, resulting in a reduced S-value. Meanwhile, if the solid content mass ratio of the room temperature curable component (B) exceeds the above upper limit, in the resulting cured film, the breaking stress tends to decrease, resulting in a reduced S-value. The solid content mass ratio of the room temperature curable component (B) is preferably 20 to 50% by mass, and more preferably 25 to 45% by mass, from the viewpoint that the S-value is higher.

[Coating Method for Electron Beam Curable Coating Composition]

Next, a coating method of the electron beam curable coating composition of the present invention is described. In the coating method of the electron beam curable coating composition of the present invention, first, the surface of the coating target is coated with the electron beam curable coating composition of the present invention. Next, the obtained coating film is subjected to room temperature curing treatment to cure (semi-cure) the room temperature curable component (B) to a state where the coating film loses its fluidity, and then the obtained semi-cured film is irradiated with an electron beam to cure the electron beam curable component (A). At this time, the curing of the room temperature curable component (B) proceeds even after electron beam irradiation, so that a cured film is formed on the surface of the coating target.

There are no particular restrictions on the coating target, as long as it can form a cured film of the electron beam curable coating composition of the present invention on its surface by electron beam irradiation, and examples thereof include metallic materials such as iron, aluminum, brass, copper, tin, zinc, stainless steel, tinplate, galvanized steel, and alloyed zinc (such as Zn—Al, Zn—Ni, and Zn—Fe) plated steel, resins such as polyethylene resin, polypropylene resin, acrylonitrile-butadiene-styrene (ABS) resin, polyamide resin, acrylic resin, vinylidene chloride resin, polycarbonate resin, polyurethane resin, and epoxy resin, plastic materials such as various types of FRP, inorganic materials such as glass, cement, and concrete, wood, fiber materials (such as paper and cloth), foam, and the like. Among these coating targets, metallic materials and plastic materials are preferable, and in particular, the electron beam curable coating composition of the present invention can be applied to plastic materials that are highly deformable.

There are no particular restrictions on the coating method of the electron beam curable coating composition, and examples thereof include the doctor knife coater method, bar coater method, applicator method, curtain flow coater method, roll coater method, spray method, gravure coater method, comma coater method, reverse roll coater method, lip coater method, die coater method, slot die coater method, air knife coater method, and dip coater method.

There are no particular restrictions on the room temperature curing conditions, as long as the room temperature curable component (B) is semi-cured, and the conditions are set to ensure that the coating film loses its fluidity at the time of electron beam irradiation. Specifically, the time for the coating film to lose its fluidity at the temperature at which room temperature curing is carried out can be determined experimentally.

There are no particular restrictions on the electron beam irradiation conditions, as long as the conditions are such that the electron beam curable component (A) is cured, and they can be set appropriately according to the specifications of the electron beam irradiation device. For example, the acceleration voltage of the electron beam is preferably 90 to 200 kV, and more preferably 120 to 150 kV, the beam current is preferably 1 to 10 mA, and more preferably 2 to 5 mA, and the irradiation time of the electron beam is preferably 0.1 to 10 seconds, and more preferably 1 to 5 seconds. These conditions are adjusted appropriately to exhibit the performance of the cured film together.

In the coating method of the electron beam curable coating composition, it is preferable that, after electron beam irradiation, the remaining unreacted isocyanate groups are reacted with active hydrogen to form the cross-linked structure (B). This tends to further improve the tensile strength (breaking stress) of the resulting cured film. One method for reacting the remaining unreacted isocyanate groups with active hydrogen is, for example, to expose the cured film after electron beam irradiation to a high humidity atmosphere (for example, humidity of 95% RH or higher). This causes the unreacted isocyanate groups to react with water molecules to produce amino groups, and these amino groups further react with the remaining unreacted isocyanate groups to produce urea bonds, forming the cross-linked structure (B).

The thickness of the resulting cured film as above can be determined according to the intended application, and for example, it is preferably 5 to 200 μm, more preferably 10 to 150 μm, and particularly preferably 20 to 100 μm. If the thickness of the cured film is less than the above lower limit, the original performance of the cured film tends not to be exhibited. Meanwhile, if the above upper limit is exceeded, the amount of electron beam reaching the deep layers of the coating film is insufficient and the deep layers of the coating film are not sufficiently cured, and the performance of the cured film tends not to be exhibited.

EXAMPLES

Hereinafter, the present invention is described in more detail based on Examples and Comparative Examples, but the present invention is not limited to the following Examples. The solid content concentrations of the electron beam curable component A and the room temperature curable component B were measured by the following methods.

<Solid Content Concentration>

First, a pre-weighed piece of aluminum foil was coated with a sample (electron beam curable component A or room temperature curable component B), which were weighed immediately to obtain the initial mass $W_0$ of the coating film. Next, the aluminum foil piece coated with the sample was placed in an oven maintained at 105° C., and the coating film was weighed every hour to obtain the mass $W_1$ of the coating film when there was no more mass change. Using the obtained masses $W_0$ and $W_1$ of the coating film, the solid content concentration C [unit: %] was calculated by the following formula:

$$C = W_1/W_0 \times 100.$$

The hydroxyl group-containing acrylic resin, electron beam curable component A, and room temperature curable component B used in Examples and Comparative Examples were prepared by the following methods.

Synthesis Example 1

In methyl isobutyl ketone, 36.0 parts by mass of methyl methacrylate, 18.0 parts by mass of n-butyl methacrylate, 35.3 parts by mass of 2-hydroxyethyl methacrylate, and 10.7 parts by mass of styrene were copolymerized using azobisisobutyronitrile as a polymerization initiator, and methyl isobutyl ketone was distilled off under reduced pressure to obtain a hydroxyl group-containing acrylic resin (hydroxyl value: 150 (design value)). The hydroxyl group content of this hydroxyl group-containing acrylic resin is 2.67 mmol/g (=hydroxyl value (150)/formula weight of potassium hydroxide (56.1)).

Preparation Example 1

The electron beam curable component A was prepared by mixing tris-acryloyloxyethyl isocyanurate modified by three caprolactones per molecule ("Aronix M-327" manufactured by Toagosei Co., Ltd., multifunctional) and urethane acrylate ("Aronix M-1200" manufactured by Toagosei Co., Ltd., bifunctional) in a mass ratio of 20:80. The solid content concentration of this electron beam curable component A was 100% by mass.

Preparation Example 2

The room temperature curable component B containing equimolar hydroxyl groups and isocyanate groups was prepared by mixing the hydroxyl group-containing acrylic resin obtained in Synthesis Example 1 and an isocyanurate form of hexamethylene diisocyanate (HDI) ("Duranate TPA-100" manufactured by Asahi Kasei Corporation, isocyanate group content: 23.1% by mass (manufacturer's published value)) at a solid content mass ratio of 5.50:2.67. The solid content concentration of this room temperature curable component B was 56.5% by mass. The isocyanate group content of the HDI isocyanurate form is 5.50 mmol/g (=isocyanate group content in 1 g of HDI isocyanurate form (0.231 g)/formula weight of isocyanate group (42.01)). The isocyanate group content in the room temperature curable component B was 7.55% by mass (=2.67/(2.67+5.50)×0.231×100).

Comparative Example 1

Tris-acryloyloxyethyl isocyanurate modified by three caprolactones per molecule ("Aronix M-327" manufactured by Toagosei Co., Ltd., multifunctional) was used alone as an electron beam curable coating material composed solely of the electron beam curable component A.

Comparative Example 2

An electron beam curable coating composition composed solely of the electron beam curable component A was prepared by mixing tris-acryloyloxyethyl isocyanurate modified by three caprolactones per molecule ("Aronix M-327" manufactured by Toagosei Co., Ltd., multifunctional) and polyester acrylate ("Aronix M-7100" manufactured by Toagosei Co., Ltd., multifunctional) in a mass ratio of 90:10.

Comparative Example 3

An electron beam curable coating composition composed solely of the electron beam curable component A was prepared in the same manner as in Comparative Example 2, except that the mixing mass ratio of the tris-acryloyloxyethyl isocyanurate and the polyester acrylate was changed to 50:50.

Comparative Example 4

An electron beam curable coating composition composed solely of the electron beam curable component A was prepared by mixing urethane acrylate ("Aronix M-1200" manufactured by Toagosei Co., Ltd., bifunctional) and polyester acrylate ("Aronix M-7100" manufactured by Toagosei Co., Ltd., multifunctional) in a mass ratio of 60:40.

Comparative Example 5

An electron beam curable coating composition composed solely of the electron beam curable component A was prepared in the same manner as in Comparative Example 4, except that the mixing mass ratio of the urethane acrylate and the polyester acrylate was changed to 40:60.

Comparative Example 6

An electron beam curable coating composition composed solely of the electron beam curable component A was prepared by mixing 2-hydroxy-3-phenoxypropyl acrylate ("Aronix M-5700" manufactured by Toagosei Co., Ltd., monofunctional) and polyester acrylate ("Aronix M-7100" manufactured by Toagosei Co., Ltd., multifunctional) in a mass ratio of 70:30.

Comparative Example 7

An electron beam curable coating composition composed solely of the electron beam curable component A was prepared in the same manner as in Comparative Example 6, except that the mixing mass ratio of the 2-hydroxy-3-phenoxypropyl acrylate and the polyester acrylate was changed to 65:35.

Comparative Example 8

An electron beam curable coating composition composed solely of the electron beam curable component A was prepared in the same manner as in Comparative Example 6, except that the mixing mass ratio of the 2-hydroxy-3-phenoxypropyl acrylate and the polyester acrylate was changed to 60:40.

Comparative Example 9

An electron beam curable coating composition composed solely of the electron beam curable component A was prepared in the same manner as in Comparative Example 6, except that the mixing mass ratio of the 2-hydroxy-3-phenoxypropyl acrylate and the polyester acrylate was changed to 55:45.

Comparative Example 10

An electron beam curable coating composition composed solely of the electron beam curable component A was prepared in the same manner as in Comparative Example 6, except that the mixing mass ratio of the 2-hydroxy-3-phenoxypropyl acrylate and the polyester acrylate was changed to 50:50.

Comparative Example 11

An electron beam curable coating composition composed solely of the electron beam curable component A was prepared in the same manner as in Comparative Example 6, except that the mixing mass ratio of the 2-hydroxy-3-phenoxypropyl acrylate and the polyester acrylate was changed to 45:55.

Comparative Example 12

Polyester acrylate ("Aronix M-7100" manufactured by Toagosei Co., Ltd., multifunctional) was used alone as an electron beam curable coating material composed solely of the electron beam curable component A.

Example 1

An electron beam curable coating composition was prepared by mixing the electron beam curable component A obtained in Preparation Example 1 and the room temperature curable component B obtained in Preparation Example 2 at a solid content mass ratio of A:B=80:20.

Example 2

An electron beam curable coating composition was prepared in the same manner as in Example 1, except that the solid content mass ratio was changed to A:B=75:25.

Example 3

An electron beam curable coating composition was prepared in the same manner as in Example 1, except that the solid content mass ratio was changed to A:B=70:30.

Example 4

An electron beam curable coating composition was prepared in the same manner as in Example 1, except that the solid content mass ratio was changed to A:B=60:40.

Example 5

An electron beam curable coating composition was prepared in the same manner as in Example 1, except that the solid content mass ratio was changed to A:B=45:55.

Comparative Example 13

An electron beam curable coating composition composed solely of the electron beam curable component A was prepared in the same manner as in Example 1, except that the room temperature curable component B was not used.

Comparative Example 14

An electron beam curable coating composition was prepared in the same manner as in Example 1, except that the solid content mass ratio was changed to A:B=95:5.

Comparative Example 15

An electron beam curable coating composition was prepared in the same manner as in Example 1, except that the solid content mass ratio was changed to A:B=90:10.

Comparative Example 16

An electron beam curable coating composition was prepared in the same manner as in Example 1, except that the solid content mass ratio was changed to A:B=85:15.

Comparative Example 17

An electron beam curable coating composition was prepared in the same manner as in Example 1, except that the solid content mass ratio was changed to A:B=30:70.

<Formation of Coating Film>

The electron beam curable coating compositions obtained in Examples and Comparative Examples were each coated on a glass plate using a doctor knife. The coating film obtained was then allowed to stand at room temperature for 17 to 20 hours, and the hydroxyl group-containing acrylic resin and the HDI isocyanurate form in the room temperature curable component B were reacted with each other to form a urethane bond. Furthermore, the semi-cured film obtained was irradiated with an electron beam using an electron beam curing device ("Curetron EBC-250-20" manufactured by NHV Corporation) under a nitrogen atmosphere at an acceleration voltage of 150 kV, a beam current of 2.5 mA, and a workpiece transfer rate of 3.9 m/min to cure the electron beam curable component A. As a result, a cured film with a thickness of 42 to 69 μm was obtained. The cured film was placed in a sealed container together with a small amount of water and maintained at a temperature of 40° C. for 16 hours to undergo high humidity treatment (humidity of 95% RH or higher). The remaining isocyanate groups were reacted with water molecules to produce amino groups, and these amino groups and the isocyanate groups were further reacted with each other to form urea bonds. Since the electron beam curable coating compositions obtained in Comparative Examples 1 to 12 and Comparative Example 13 did not contain the room temperature curable component B, only curing by electron beam irradiation was performed, and standing at room temperature and the high humidity treatment were omitted.

<Tensile Test>

The cured film obtained was released from the glass plate with a length of 100 mm or more and a width of 10 mm, and tensile tests were conducted four times using an Instron universal testing machine ("Model 5566" manufactured by Instron) under the conditions of an initial gripping distance of 50 mm and a crosshead speed of 5 mm/min to obtain the breaking elongation and breaking stress. These results are shown in Tables 1 and 2. The values in the tables are the average values over the four tensile tests.

<Usefulness>

Based on the breaking elongations and breaking stresses shown in Tables 1 and 2, the S-value was determined by the following formula:

$$S = Y + 2 \times X \quad (X \leq 10)$$

$$S = Y + 20 \quad (X > 10)$$

Figure 2:
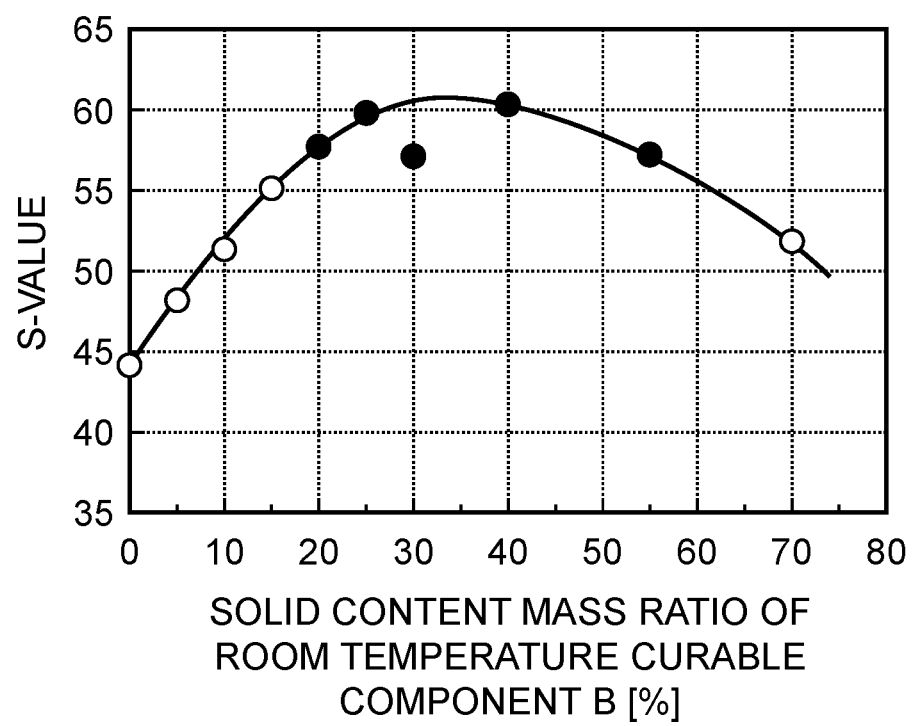
FIG. 2 is a graph showing the results of plotting the S-values of the electron beam curable coating compositions obtained in Examples 1 to 5 and Comparative Examples 13 to 17 versus the solid content mass ratio of the room temperature curable component B to the total amount of the electron beam curable component A and the room temperature curable component B.

(S is an index for the usefulness of the coating film, X is the breaking elongation [%], and Y is the breaking stress [MPa]). The results are shown in Tables 1 and 2. The S-values of the electron beam curable coating compositions obtained in Examples 1 to 5 and Comparative Examples 13 to 17 were plotted versus the solid content mass ratio of the room temperature curable component B to the total amount of the electron beam curable component A and the room temperature curable component B. The results are shown in FIG. 2.

TABLE 1

| | Acrylate Mass Ratio [Mass %] | | | | Tensile Test | | Usefulness |
| --- | --- | --- | --- | --- | --- | --- | --- |
| | M-327 | M-1200 | M-5700 | M-7100 | Breaking Elongation [%] | Breaking Stress [MPa] | S-Value |
| Comp. Ex. 1 | 100 | | | | 5.6 | 31.6 | 42.7 |
| Comp. Ex. 2 | 90 | | | 10 | 3.8 | 32.6 | 40.2 |
| Comp. Ex. 3 | 50 | | | 50 | 3.8 | 42.3 | 50.0 |
| Comp. Ex. 4 | | 60 | | 40 | 3.7 | 28.0 | 35.4 |
| Comp. Ex. 5 | | 40 | | 60 | 3.0 | 38.8 | 44.7 |
| Comp. Ex. 6 | | | 70 | 30 | 23.1 | 16.1 | 36.1 |
| Comp. Ex. 7 | | | 65 | 35 | 8.3 | 19.9 | 36.6 |
| Comp. Ex. 8 | | | 60 | 40 | 6.1 | 25.8 | 38.1 |
| Comp. Ex. 9 | | | 55 | 45 | 5.4 | 28.9 | 39.7 |
| Comp. Ex. 10 | | | 50 | 50 | 4.5 | 29.9 | 39.0 |
| Comp. Ex. 11 | | | 45 | 55 | 2.0 | 26.8 | 30.7 |
| Comp. Ex. 12 | | | | 100 | 2.2 | 37.6 | 42.1 |

M-327: Caprolactone-modified tris-acryloyloxyethyl isocyanurate (multifunctional)
M-1200: Urethane acrylate (bifunctional)
M-5700: 2-hydroxy-3-phenoxypropyl acrylate (monofunctional)
M-7100: Polyester acrylate (multifunctional)

As shown in Table 1, in the conventional electron beam curable coating compositions composed solely of the electron beam curable component A containing a multifunctional (meth)acrylate, the cured films with a breaking elongation of 7% or less all had a breaking stress of 25 MPa or more, but the S-value was 50 or less. The cured films with a breaking elongation of 8% or more had a breaking stress of 20 MPa or less, and the S-value was 50 or less as well.

TABLE 2

| | Solid Content Mass Ratio [Mass %] | | Tensile Test | | Usefulness |
| --- | --- | --- | --- | --- | --- |
| | Electron Beam Curable Component A | Room Temperature Curable Component B | Breaking Elongation [%] | Breaking Stress [MPa] | S-Value |
| Example 1 | 80 | 20 | 12.4 | 37.7 | 57.7 |
| Example 2 | 75 | 25 | 9.5 | 40.7 | 59.7 |
| Example 3 | 70 | 30 | 6.8 | 43.5 | 57.1 |
| Example 4 | 60 | 40 | 6.2 | 47.9 | 60.3 |
| Example 5 | 45 | 55 | 5.4 | 46.3 | 57.2 |
| Comp. Ex. 13 | 100 | 0 | 36.5 | 24.1 | 44.1 |
| Comp. Ex. 14 | 95 | 5 | 40.6 | 28.1 | 48.1 |
| Comp. Ex. 15 | 90 | 10 | 41.7 | 31.3 | 51.3 |
| Comp. Ex. 16 | 85 | 15 | 20.2 | 35.1 | 55.1 |
| Comp. Ex. 17 | 30 | 70 | 5.8 | 40.1 | 51.8 |

As shown in Table 2 and FIG. 2, in the electron beam curable coating composition composed solely of the electron beam curable component A containing a multifunctional (meth)acrylate (Comparative Example 13), the cured film obtained had a breaking elongation of 36.5%, a breaking stress of 24.1 MPa, and an S-value of 44.1. In contrast, in the electron beam curable coating compositions containing 80 to 45% by mass of this electron beam curable component A and 20 to 55% by mass of the room temperature curable component B containing a compound having an isocyanate group (Examples 1 to 5), the cured films obtained had a breaking elongation of 5.4 to 12.4%, a breaking stress of 37.7 to 47.9 MPa, and an S-value of 57.1 to 60.3. These results showed that by blending the electron beam curable component A containing a multifunctional (meth)acrylate with the room temperature curable component B containing a compound having an isocyanate group in a predetermined amount, the resulting cured film had a small breaking elongation and a large breaking stress, resulting in a large S-value, which sufficiently improved its usefulness.

On the other hand, in the electron beam curable coating compositions containing 95 to 85% by mass of the electron beam curable component A and 15 to 5% by mass of the room temperature curable component B (Comparative Examples 14 to 16), the cured films obtained had a breaking elongation of 20.2 to 41.7%, a breaking stress of 28.1 to 35.1 MPa, and an S-value of 48.1 to 55.1. These results showed that if the amount of the room temperature curable component B blended was too small, the breaking elongation of the resulting cured film was not sufficiently small, the breaking stress was not sufficiently large as well, and consequently the S-value was not sufficiently large, resulting in insufficient improvement in usefulness.

In the electron beam curable coating composition containing 30% by mass of the electron beam curable component A and 70% by mass of the room temperature curable component B (Comparative Example 17), the cured film obtained had a breaking elongation of 5.8%, a breaking stress of 40.1 MPa, and an S-value of 51.8. The results showed that if the amount of the room temperature curable component B blended was too large, the breaking elongation of the resulting cured film was sufficiently small, but the breaking stress was not sufficiently large, and consequently the S-value was not sufficiently large, resulting in insufficient improvement in usefulness.

As explained above, the present invention makes it possible to obtain a cured film that has both high tensile strength (breaking stress) and high breaking elongation. Therefore, the electron beam curable coating composition of the present invention is useful for applications that require coating resistant to damage by external forces, such as automotive paints, especially paints for automotive exterior parts.

What is claimed is:

1. An electron beam curable coating composition comprising:
    an electron beam curable component (A) which contains 10% by mass or more of a multifunctional (meth) acrylate; and
    a room temperature curable component (B) which is a mixture of a compound having an isocyanate group and a compound having a functional group containing active hydrogen; wherein the compound having an isocyanate group contains at least one compound selected from the group consisting of tolylene diisocyanate, diphenylmethane diisocyanate, hexamethylene diisocyanate, isophorone diisocyanate, xylylene diisocyanate, hydrogenated xylylene diisocyanate, naphthalene diisocyanate, methylenebis cyclohexylene diisocyanate, biuret forms thereof, and isocyanurate forms thereof, and the compound having a functional group containing active hydrogen contains at least one of hydroxyl group-containing acrylic resins and amino group-containing acrylic resins, wherein component (B) is not cured by electron beam irradiation, and a content of isocyanate groups in component (B) is 1 to 15% by mass; and
    a solid content mass ratio of the component (B) to a total amount of the components (A) and (B) is 20 to 55% by mass.

2. The electron beam curable coating composition according to claim 1, wherein the electron beam curable component (A) contains 10% by mass or more of a trifunctional or higher (meth)acrylate.

* * * * *